Sept. 12, 1967    J. ISREELI    3,341,022
DIALYZER ASSEMBLING MEANS
Filed Nov. 16, 1964
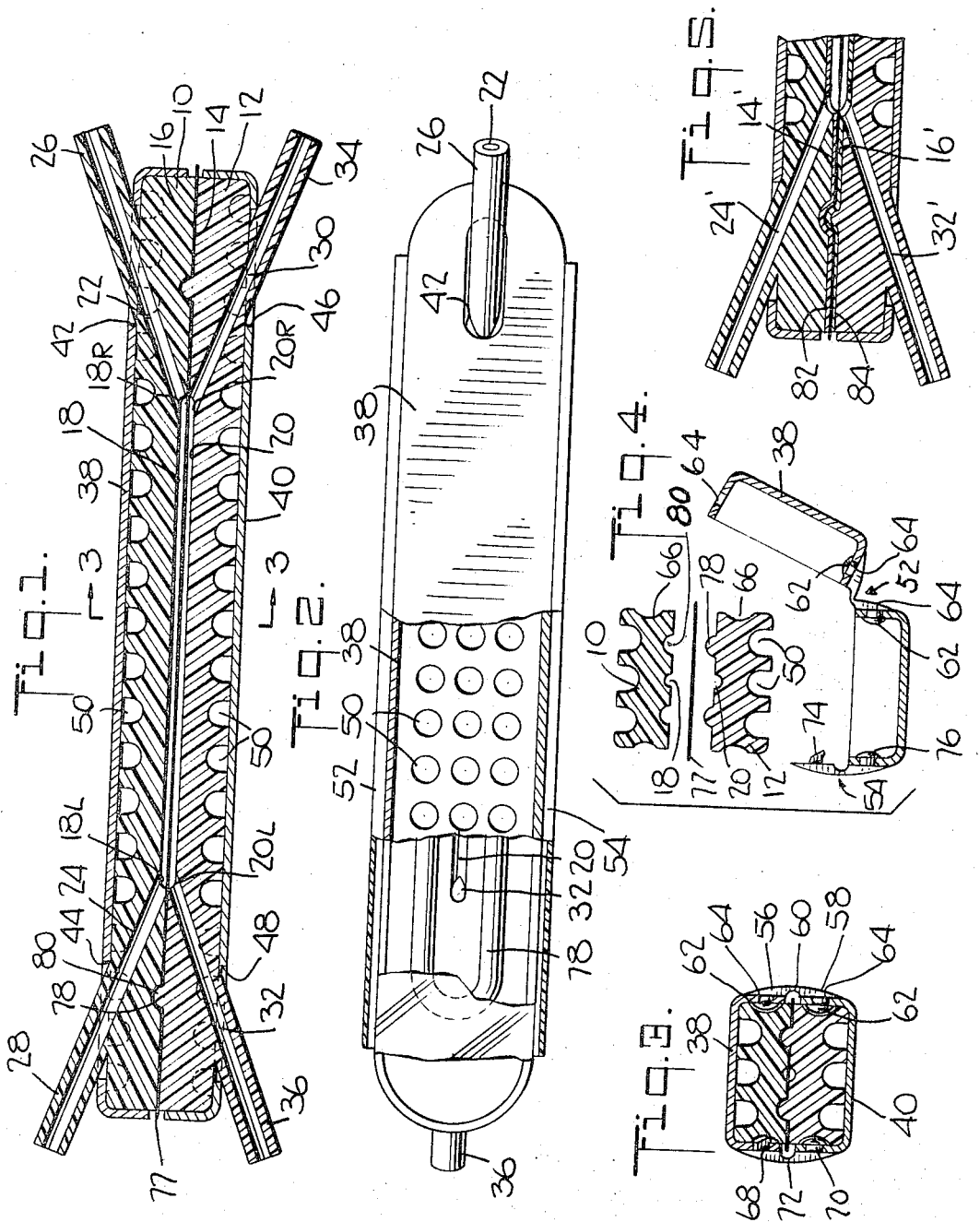
INVENTOR.
JACK ISREELI
BY
ATTORNEY

3,341,022
DIALYZER ASSEMBLING MEANS

Jack Isreeli, Tuckahoe, N.Y., assignor to Technicon Instruments Corporation, Chauncey, N.Y., a corporation of New York
Filed Nov. 16, 1964, Ser. No. 411,223
2 Claims. (Cl. 210—232)

This invention relates to the separation of liquids and especially to an apparatus for dialysis.

An apparatus for the dialysis of liquids is shown in the U.S. patent to Andres Ferrari, U.S. 3,211,645, issued October 12, 1965. In that apparatus the dialyzer includes two matching plates, each having a counterpart groove which together form the chamber, and a membrane disposed between the two grooves. The membrane must be taut for proper dialysis, and, therefore, is tautened prior to the assembly being clamped together.

It is an object of this invention to provide a dialyzer which automatically tautens the membrane during assembly.

It is another object of this invention to provide a dialyzer which may be easily and rapidly manually assembled without tools.

A feature of this invention is a pair of shell members having aligning and interlocking means and enclosing a pair of dialyzer plates having a mating annular rib and groove surrounding the dialysis chamber for automatically stretching a membrane disposed therebetween as the plates are clamped together by the shell members.

These and other objects, features and advantages of this invention will become apparent from the following description of the invention considered in connection with the accompanying illustrative drawings of the presently preferred embodiment of the invention in which:

FIG. 1 is a longitudinal transverse section of a dialyzer embodying this invention;

FIG. 2 is a plan view, partially broken away, of the dialyzer of FIG. 1;

FIG. 3 is a lateral transverse section of the dialyzer of FIG. 1, taken along line 3—3 of FIG. 1;

FIG. 4 is an exploded view of the section of FIG. 3, but showing the dialyzer disassembled; and FIG. 5 is a portion of a longitudinal transverse section of a second embodiment of this invention.

The dialyzer comprises two plates 10 and 12 having mating confronting surfaces 14 and 16 respectively. Two mating confronting grooves 18 and 20 are respectively formed into the mating surfaces 14 and 16 to form a chamber. Two passageways 22 and 24 are integrally formed in the plate 10 to respectively interconnect one end 18R of the groove 18 with an integral tube fitting 26, and the other end 18L of the groove 18 with an integral tube fitting 28. Two passageways 30 and 32 are integrally formed in the plate 12 to respectively interconnect one end 20R of the groove 20 with an integral tube fitting 34, and the other end 20L of the groove 20 with an integral tube fitting 36.

The plate 10 is disposable within a box-like shell 38 and the plate 12 is disposable with a box-like shell 40. The shell 38 has two apertures 42 and 44 therein to respectively receive therethrough the fittings 26 and 28. The shell 40 has two apertures 46 and 48 therein to respectively receive therethrough the fittings 34 and 36. The outer surface of the plates 10 and 12 are formed with a plurality or grid of cavities 50 therein to provide the plates with flexibility to enable full contact between the confronting surfaces 14 and 16 when the plates 10 and 12 are clamped together by the shells 38 and 40. In this regard the plates may advantageously be made of Tygon polyvinyl plastic and the shells of stainless steel.

The shells are joined together and aligned by a hinge strip 52 and are joinable by a lock strip 54. The hinge strip 52 comprises an elongated strip of resilient plastic, such as polypropylene, having a cross-section which is best shown in FIG. 3. The cross-section includes two relatively thicker end portions 56 and 58 and a relatively thinner medial portion 60. Each of the end portions is provided with a longitudinal row of integral mushroom-like projections 62, which are disposed through a longitudinal row of mating apertures 64 formed along the margin of the shell. Each of the plates is also formed with a longitudinal row of cavities 66 to accommodate the heads of the projections 62. The lock strip 54 similarly comprises an elongated strip of resilient plastic, such as polypropylene, having a cross-section which includes two relatively thicker end portions 68 and 70 and a relatively thinner medial portion 72. The end portion 68 is provided with a longitudinal row of integral hook-like projections 74 which are disposable through and snap-lockable behind a longitudinal row of mating apertures 64 formed along the margin of the adjacent shell. The end portion 70 is provided with a longitudinal row of mushroom-like projections 76 which are disposed through a longitudinal row of mating apertures 64 formed along the margin of the shell. Each of the plates is also formed with a longitudinal row of cavities 66 to accommodate the heads of the projections 74 or 76.

A semi-permeable membrane 77 is disposable between the plates 10 and 12 and has an outline which is slightly greater than the periphery of the adjacent surfaces 14 and 16 of the plates, so that a margin of the membrane will extend beyond the plates when the assembly is clamped together. The mating edges of the shells are spaced apart, when the shells are locked about the plates to clear this peripherally extending margin of membrane. Further, the medial portions 60 and 72 of the hinge and the lock strips are each formed with a concave groove to clear this margin of membrane. Thus the full annulus of the margin of membrane is exposed to the liquid of a heating bath when and if the dialyzer is disposed therein.

The plate 12 has a rib 78 formed from the surface 16 as an annulus around the groove 20. The plate 10 has a groove 80 formed into the surface 14 as an annulus around the groove 20, mating with the rib 78. In assembly, the plate 12 is interfitted within the shell 40, and the plate 10 is interfitted within the shell 38. The membrane is then laid on one of the faces 14 and 16, and the two plates are swung together and inter-locked by means of the hook-like projections 74 being snapped into their mating apertures 64. As the plates are squeezed together the membrane 77 is stretched around the rib 78 by the groove 80, thereby tautening the portion of the membrane bounded by this rib and the groove. It will be appreciated that this tautening action is automatic as the plates are clamped together by the shells, and thus the membrane need not be pretautened prior to the clamping operation.

When it is desired to change membranes, or to clean the dialyzer, the assembly can be opened by peeling the portion 68 of the locking strip 72 away from the adjacent shell, releasing the hook-like projections 74 from their mating apertures 64.

It is often desirable to provide a dialyzer with non-wetting surfaces where the liquid being dialyzed will be contacted. In the embodiment shown in FIG. 5 the dialyzer is provided with two preformed liners 82 and 84 of a suitable non-wetting material. For example, the liners may be die-formed from 0.005 inch sheets of Teflon. The liner 82 conforms to the irregularities of the surface 14' and the liner 84 conforms to the irregularities of the surface 16'. The liners are apertured adjacent the passageways such as 24' and 32' to place the chamber in fluid flow communication with the four passageways. If desired, tubing made of similar non-wetting material may be fitted into each of the four passageways up to the liners, to completely line the dialyzer.

While I have shown and described the preferred embodiment of my invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. A dialyzer comprising: two companion plate members, each having a surface with a groove therein; means for mounting said members with said surfaces in confronting face-to-face relation, with said grooves in mutual register to form a chamber, including two confronting shell members intercoupled by aligning and interlocking means; each of said plate members having two integral tube fittings projecting therefrom, and two passageways, each passageway providing a fluid flow communication between a respective tube fitting and a respective end of said chamber forming groove; each of said shell members having two apertures therein, each for passing a respective tube fitting therethrough; each of said plate members having a plurality of cavities therein for providing said respective plate member with resiliency, whereby said respective plate member may be resiliently distorted when being assembled into said respective shell member; a membrane disposed between said plate members; means for engaging said membrane around said chamber and tautening the included portion of said membrane while said plate members are being mounted in confrontation.

2. A dialyzer according to claim 1, wherein: said tautening means includes one of said surfaces also having an additional groove surrounding said respective chamber forming groove; the other of said surfaces also having a rib surrounding said respective chamber forming groove, and mating with said additional groove, said membrane being disposed between and distorted by said mating rib and said additional groove, whereby the included portion of said membrane is tautened while said members are being mounted in confrontation.

References Cited

UNITED STATES PATENTS

| | | | |
|---|---|---|---|
| 2,247,143 | 6/1941 | Bailey | 210—21 |
| 3,028,965 | 4/1962 | Isreeli | 210—321 |
| 3,211,645 | 10/1965 | Ferrari | 210—321 X |

OTHER REFERENCES

Cole et al.: "The Pumpless Low Temperature Hemodialysis System." From Transactions American Society For Artificial Internal Organs, vol. VIII, pp. 209–211 and 215–217. Presented at Atlantic City, N.J., April 13–14, 1962.

Sachs et al.: "Stretching of the Dialysis Membrane—A New Device For the Improvement of Artificial Kidneys for the Treatment of Chronic Nephritis. Preliminary Report, from Transactions American Society for Artificial Internal Organs, vol. IX, pp. 79, 80 and 82–84. Presented at Atlantic City, N.J., April 15–16, 1963.

REUBEN FRIEDMAN, *Primary Examiner.*

F. SPEAR, *Assistant Examiner.*